(12) United States Patent
Dubus et al.

(10) Patent No.: US 6,894,402 B2
(45) Date of Patent: May 17, 2005

(54) METHOD FOR CONTROLLING A POLYPHASE AND REVERSIBLE ROTATING ELECTRICAL MACHINE FOR HEAT ENGINE MOTOR VEHICLE

(75) Inventors: Jean-Marc Dubus, Evry (FR); Eckart Westerholt, Saint-Maur (FR)

(73) Assignee: Valeo Equipments Electriques Moteur (FR)

( * ) Notice: Subject to any disclaimer, the term of this patent is extended or adjusted under 35 U.S.C. 154(b) by 203 days.

(21) Appl. No.: 10/239,893

(22) PCT Filed: Jan. 23, 2002

(86) PCT No.: PCT/FR02/00269
§ 371 (c)(1),
(2), (4) Date: Sep. 26, 2002

(87) PCT Pub. No.: WO02/060711
PCT Pub. Date: Aug. 8, 2002

(65) Prior Publication Data
US 2003/0038482 A1 Feb. 27, 2003

(30) Foreign Application Priority Data
Jan. 31, 2001 (FR) ............................................. 01 01341

(51) Int. Cl.⁷ ................................................. F02N 11/00
(52) U.S. Cl. ....................... 290/40 C; 180/65.2; 322/16
(58) Field of Search ............................. 290/40 A, 40 C, 290/40 D; 180/65.2; 318/8, 9; 322/16, 29

(56) References Cited

U.S. PATENT DOCUMENTS

| | | | | |
|---|---|---|---|---|
| 4,803,376 A | | 2/1989 | N'Guyen | |
| 5,818,116 A | * | 10/1998 | Nakae et al. | 290/38 R |
| 5,988,137 A | * | 11/1999 | Tamura et al. | 123/295 |
| 6,209,517 B1 | * | 4/2001 | Yasui | 123/339.11 |
| 6,242,881 B1 | * | 6/2001 | Giordano | 318/700 |
| 6,252,381 B1 | * | 6/2001 | Schenk | 322/28 |
| 6,504,259 B1 | * | 1/2003 | Kuroda et al. | 290/40 C |
| 6,522,024 B1 | * | 2/2003 | Takaoka et al. | 290/40 C |

FOREIGN PATENT DOCUMENTS

| | | |
|---|---|---|
| DE | 197 38 250 A1 | 3/1999 |
| DE | 100 01 436 A1 | 8/2000 |
| EP | 0 715 979 B1 | 6/1996 |

* cited by examiner

Primary Examiner—Nicholas Ponomarenko
(74) Attorney, Agent, or Firm—Liniak, Berenato & White

(57) ABSTRACT

Method for control of a multi-phase, reversible, rotating electrical machine, called alternator/starter, for a motor vehicle with a heat engine capable of operating either as an electrical generator—alternator mode—or as an electric motor, especially in order to start the heat engine, characterised in that, during operation in electric-motor mode, the said machine is driven according to two modes corresponding to different speed/torque characteristic curves, namely a first mode, called starter mode, making it possible to drive the heat engine of the vehicle in order to start it with high torques for low speeds, while the second mode, called auxiliary-motor mode, makes it possible to drive at least one power-consumer unit, such as an accessory, and/or the heat engine, at higher speeds and lower torques than those of the first mode.

16 Claims, 3 Drawing Sheets

FIG.1

METHOD FOR CONTROLLING A POLYPHASE AND REVERSIBLE ROTATING ELECTRICAL MACHINE FOR HEAT ENGINE MOTOR VEHICLE

FIELD OF THE INVENTION

The present invention relates to a reversible, rotating electrical machine such as an alternator/starter for a vehicle, especially a motor vehicle.

Such a machine is described, for example, in the documents EP-A-0 260 1786, FR-A-2 745 444 and FR-A-2 745 445, to which reference can be made for further details.

This machine, of the multi-phase type, operates, on the one hand, as an electrical current generator and, on the other hand, as an electric motor.

This machine thus operates as an alternator, especially for charging the battery and supplying the power-consumer units of the vehicle, such as accessories, and as a starter for driving the starter ring gear of the internal-combustion engine, also known as heat engine, of the motor vehicle, for starting it.

To that end, the rectifier bridge at the output from the armature of the alternator also serves as a bridge for control of the phases of the alternator. This bridge is also called inverter.

State of the Art

In a known way, this rotating machine, in one embodiment, is associated with the engine flywheel of the motor vehicle, being, for example, secured onto it, and therefore turns at the same rotational speed as the crankshaft of the heat engine of the motor vehicle, rotationally driving the engine flywheel, which is possibly in two parts in order to form a damping flywheel equipped with elastic members acting between the two parts, or a flexible flywheel. In both these cases, the rotor of the machine is carried by one of these parts.

In a variant, the reversible machine is driven in rotation by the crankshaft by way of a motion-transmission device such as a device with pulleys and a belt. In this case, the machine turns at a speed higher than that of the crankshaft.

In all cases, the rotating electrical machine comprises:
- a wound rotor, constituting the inverter conventionally associated with two collector rings and two brushes via which the excitation current is led in;
- a multi-phase stator carrying several coils or windings, constituting the armature, which are connected in star or in delta mode in the most frequent case of a three-phase structure and which deliver the converted electrical power to the rectifier bridge, in alternator-mode operation.

The bridge is linked to the various phases of the armature and is mounted between earth and an electrical power-supply line of the on-board network of the vehicle linked to the positive power-supply terminal of the battery. This bridge features several arms with diodes, for example, integrated with transistors of the MOSFET type, or more generally with switches as described, for example, in the document FR-A-2 745 445.

The operation of such a machine in motor mode is achieved by imposing a direct current in the inverter, for example, and by delivering signals, ideally sinusoidal but possibly trapezoidal or square as the case may be, phase-shifted by 120°, in synchronous fashion, on the phases of the stator.

This rectifier and control bridge is driven by an electronic control and monitoring module. The bridge and the control module belong to a unit, called control and monitoring unit, most often installed outside the machine and including a regulator device for voltage regulation intended to maintain the voltage of the battery as constant as possible. These means are short-circuited in electric motor mode.

This unit includes a computer, such as a microcontroller.

Means are furthermore provided for tracking the angular position of the rotor in order, in electric-motor mode, to inject the electric current at the correct moment into the appropriate phase and thus into the relevant winding of the stator.

These means, advantageously of the magnetic type, in a variant of the optical type, send information to the electronic control and monitoring unit and are described, for example, in the documents FR-A-2 807 231 filed on Nov. 20, 2000 and FR-A-2 806 223 filed on Mar. 10, 2000.

These means therefore include a target locked in rotation onto the rotor or the pulley of the machine and at least one sensor of the Hall-effect or magnetoresistive type detecting the passage of the target, advantageously of the magnetic type.

For preference, at least three sensors are provided, these being carried by the front or rear bearing which the rotating electrical machine includes for fixedly supporting the stator and rotationally supporting the rotor.

In the document EP-A-0 715 979, provision has been made to make the machine work as an auxiliary motor. More precisely, an auxiliary battery is provided such that it is possible to carry out programming in order, when the vehicle is stationary, to start up the air-conditioning device of the motor vehicle. To do this, the reversible electrical machine and the compressor of the air-conditioning device are integral in rotation with a rotating member itself coupled to the heat engine via a unidirectional transmission, in such a way as to be driven by the heat engine when the latter is operating and not to drive the heat engine when the machine is operating in motor mode when the vehicle is stationary.

In the document FR 0016133 filed on Dec. 12, 2000, provision has also been made to make the machine work as an auxiliary motor especially when the heat engine of the vehicle is turned off at a red light.

In all cases, an electronic control and monitoring unit is provided, including a changeover switch making it possible, on the one hand, to connect the wound rotor of the machine to a voltage-regulator device monitoring the current strength flowing in the inductor when the machine is operating as an electrical generator—alternator mode—and, on the other hand, to connect the stator of the machine to a control device, such as an inverter, sequentially driving the phases of the armature with the participation of sensors of the angular position of the rotor when the machine is operating as an electric motor, especially as a starter motor.

The object of the present invention is to pull part [sic] of this machine in a simple and economical way.

According to the invention, a method for control of a multi-phase and reversible rotating electrical machine, called alternator/starter, for a motor vehicle with a heat engine capable of operating either as an electrical generator—alternator mode—or as an electric motor, especially in order to start the heat engine, is characterised in that, during operation in electric-motor mode, the said machine is driven according to two modes corresponding to different speed/torque characteristic curves, namely a first mode, called heat-engine starter mode, making it possible to drive the heat engine of the vehicle in order to start it with high torques for low speeds, while the second mode, called auxiliary-motor mode, makes it possible to drive the machine alone, or at least one power-consumer unit, such as an accessory, and/or the heat engine, at higher speeds and lower torques than those of the first mode.

By virtue of the invention, the rotating and reversible electrical machine is used as an auxiliary electric motor within a speed range higher than that necessary to start the heat engine. Hence, it is possible to stop the heat engine of the motor vehicle at a red light, and to drive at least one accessory via the electrical machine, such as the compressor of the air-conditioning device. Then the heat engine can be restarted. In a variant, the accessory is an assistance pump for assisted hydraulic steering, such that it is possible to turn the wheels when the heat engine is stopped at a red light. Needless to say, it is possible, in auxiliary-motor mode, to drive several power-consumer units or loads or, in a variant, to drive the machine alone before changing to alternator mode.

In one embodiment, when in the second mode, the said machine is disconnected from the engine of the heat engine [sic] of the motor vehicle.

For example, a device is provided making it possible no longer to drive the pulley of the crankshaft of the heat engine of the vehicle or the crankshaft itself. This device may include an electromagnetic clutch, a controlled freewheel, etc. A mechanical device therefore makes it possible to disengage the machine and the accessory to be driven; constituting a power-consumer unit, especially consuming mechanical and/or electrical power, from the crankshaft.

In a variant, it is possible to vary the transmission ratio of the motion-transmission device.

It is therefore advantageously possible to use different transmission ratios, depending on the chosen operating mode. This can be achieved with the aid of known devices: epicyclic train, freewheel double pulley with reverse freewheel direction. In the case of a double transmission ratio, each belt is equipped either with a fixed tension system or with an automatic tension system, respectively on each of the slack strands. In the case of the use of an epicyclic train integrated into the crankshaft pulley, or of a fixed transmission ratio, the belt tension can be applied either by the use of a fixed tensioner or of a dynamic reversible tensioner or of two tensioners each acting in only one operating mode.

According to one characteristic, the winding of the rotor is over-excited in starter mode (first mode) in order to maximise the starting torque of the alternator/starter. Advantageously, this over-excitation is applied also in the second, auxiliary-motor mode.

It is thus possible to increase the power from the machine without having to use more powerful batteries.

The alternator/starter can therefore start an internal-combustion engine of a more powerful motor vehicle and/or start the said engine at low temperatures.

This over-excitation can be achieved via an overvoltage at the terminals of the excitation winding and/or an overcurrent in the excitation winding by comparison with a conventional alternator.

This can be achieved by the use of an electronic voltage booster or else by taking action on the number of turns of the excitation winding and on its resistance so as to obtain a higher number of ampereturns for the same power-supply voltage.

In one embodiment, the cross-section of the conducting wire of the excitation coil is increased. It is possible to act on the number of turns of the excitation winding.

In one embodiment, the winding of the rotor is over-excited solely in starter mode and, likewise advantageously, in auxiliary-motor mode.

In another embodiment, the winding of the rotor is over-excited also in alternator mode.

By virtue of these characteristics, control of the power supply of the excitation winding (that is to say of the winding of the rotor) is proposed, in starter mode, which makes it possible rapidly to deliver the starting torque, to increase it and to minimise the heat dissipation and to maximise the power at start-up, as well as during the second mode, the machine then working as an auxiliary motor.

The method of governing the auxiliary-motor mode can be described as follows. If the accessory has to be able to be used before the vehicle has been started up (programmed temperature pre-conditioning of the passenger compartment) the method consists in bringing it to its rotational speed via the electrical machine, passing through a starter phase (rotor over-excitation, without driving the heat engine) then to a speed no to change over into auxiliary-motor mode. Once a speed n1 has been reached, the system is loaded, the resultant speed nx then depends on the power of the load and on that produced by the auxiliary-motor mode; the value of this speed nx being adjustable by reducing the flux of the rotor of the auxiliary motor to a greater or lesser extent.

In the case in which the vehicle to be started uses the auxiliary-motor mode, there then exists the possibility of inertial starting. The second motor mode is used to do this (crankshaft disengaged), and the machine is driven to the maximum attainable speed, then the crankshaft is engaged. When the auxiliary-motor mode has to be activated whereas an engine-stop phase is anticipated, the load (the power-consumer unit) being driven is shed, the crankshaft disengaged, and the auxiliary-motor mode is activated, the speed then being higher than n0; the starter mode is not re-entered, the device is then again loaded, the resultant speed nx then depending on the power of the load and on that produced by the auxiliary-motor mode (the value of this speed nx being adjustable by lowering the flux in the rotor of the auxiliary motor to a greater or lesser extent).

At the moment of restarting, the driven load is shed, which has the consequence of an increase in the rotational speed, then starting is carried out identically to the inertial starting by engaging the crankshaft.

The electronic control and monitoring unit can allow for the management of this preconditioning, as well as ensure the security matters relating to persons: no starting with the bonnet open, doors open, restarting in the event of a dangerous pressure drop in the braking system, contact established after a stop phase, identification of the transponder code inhibiting starting in the event of an attempted theft, etc, as well as indicate malfunctions: belt slipping, belt broken, state of battery charge.

In one embodiment, part of the means for tracking rotation of the rotor are pulled [sic], and, more precisely fixed sensors of these means.

More precisely, in the first mode according to the invention, the signals from the sensors linked to the electronic control and monitoring (and therefore management) unit are used in straightforward order. In the second mode, the order of use of the signals from the sensors is altered by combining and inverting signals from the sensors making it possible to phase-shift the control signals sent by the control and monitoring unit to the phases of the stator.

Needless to say, in auxiliary-motor mode, the excitation current of the excitation winding of the rotor is set in a different way to that of the alternator and starter modes.

BRIEF DESCRIPTION OF THE DRAWINGS

Other characteristics and advantages of the invention will emerge further from the description which follows, which is purely illustrative and not limiting, and should be read with regard to the attached figures, in which:

FIG. 1 is a view in axial section, without axial sectioning of the rotor of the target and of the target holder, of an alternator/starter according to the document FR-A-2 806 223;

DESCRIPTION OF PREFERRED EMBODIMENTS OF THE INVENTION

Figure 2:
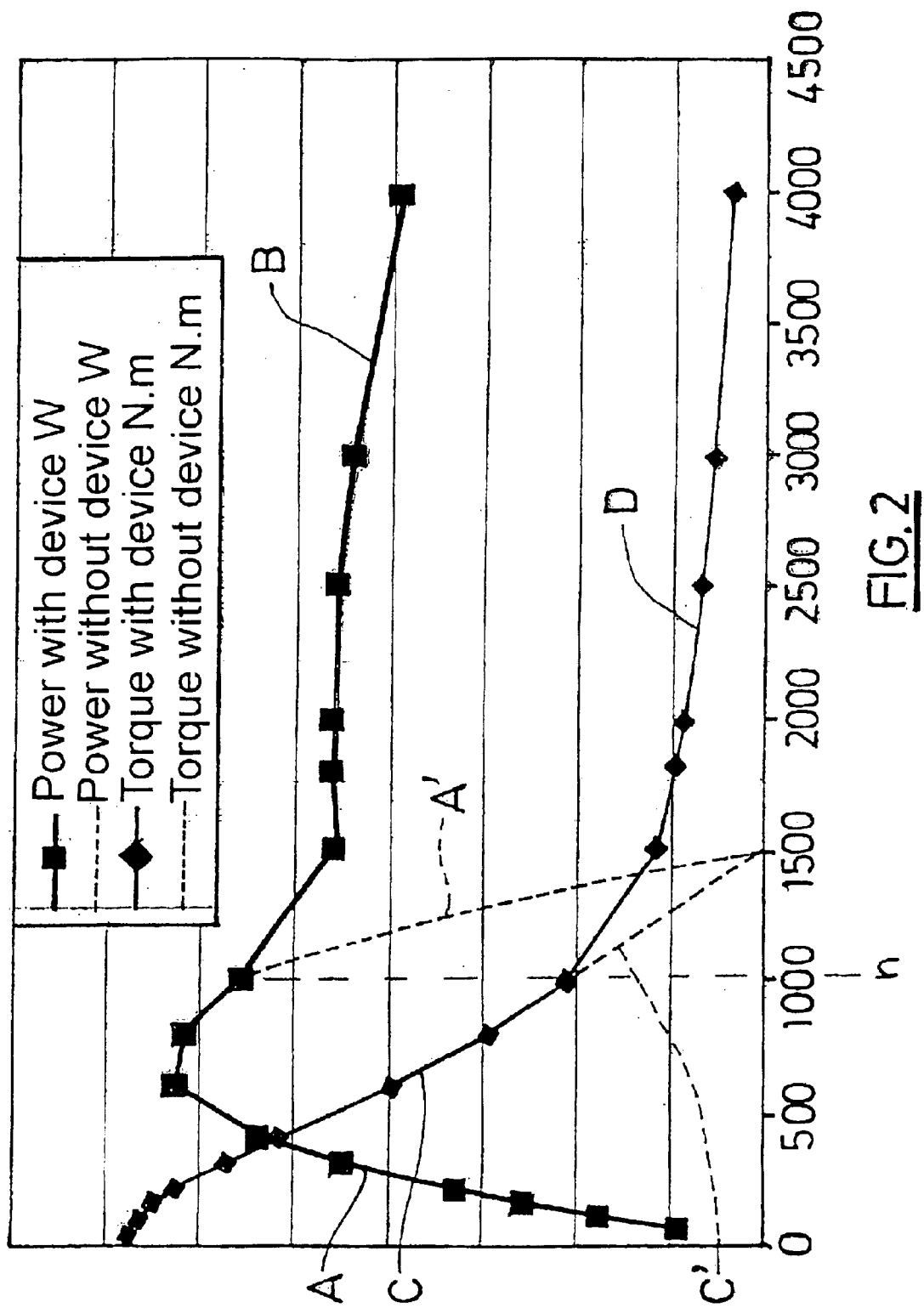
FIG. 2 shows the characteristic curves (torque and power as a function of the rotational speed (number of rpm)—namely that of the rotor of the machine—proportional to that of the heat engine of the vehicle)

In the figures, the reversible rotating electrical machine, of the multi-phase type, is an alternator/starter of the above-mentioned type is [sic] described, for example, in the documents FR-A-2 807 231 and FR-A-2 806 223 mentioned above.

Here, this machine has the structure of a conventional alternator, for example of the same type as that described in the document EP-A-0 515 259, to which reference should be made for further details.

Figure 1:
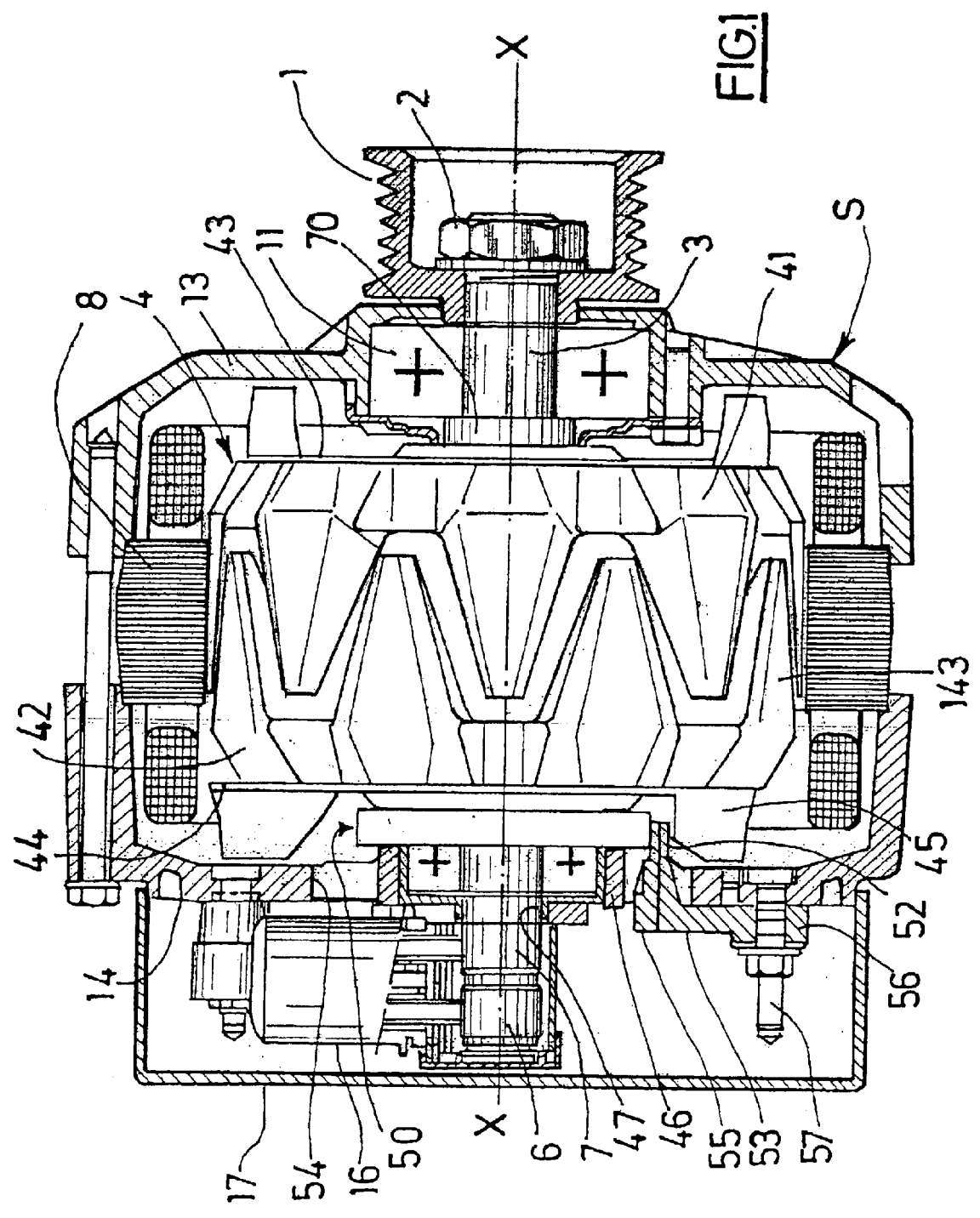

This machine, as illustrated in FIG. 1, therefore has internal ventilation (air cooling), its claw-type rotor 4 carrying, at least at one of its axial ends, an internal fan 43, 44 with blades 45. In a variant, the machine is water-cooled as described, for example, in the document DE-A-100 19 914; the support for the stator of the machine including a fluid-circulation channel.

More precisely, in FIG. 1, the rotor 4 is a rotor of the Lundell claw type, with pole wheels 41, 42 carrying, at their outer periphery, teeth 143 of axial orientation and of trapezoidal shape. The teeth 143 of one pole wheel are turned towards the teeth of the other pole wheel, the said teeth, of overall trapezoidal shape, being distributed in imbricated fashion from one pole wheel to the other.

Needless to say, as described, for example, in the document FR-A-2 793 085, permanent magnets can be interposed between the teeth of the pole wheels in order to increase the magnetic field and hence the power of the machine. These teeth arise from the outer periphery of a transverse flange which each pole wheel 41, 42 includes.

The rotor 4 centrally carries an excitation winding between the flanges of its pole wheels. This winding can be seen, for example, in FIG. 3 of the document FR-A-2 806 223, and is carried by cores arising from the flanges of the wheels 41, 42 or via a core constituting a strut between the said flanges.

The excitation winding includes an electrically conducting element which is wound with turns being formed. This excitation winding, when it is activated, magnetises the rotor 4 so as, with the aid of the teeth 143, to create pairs of North-South magnetic poles. The extremities of the winding of the rotor are each linked to a collector ring 6, 7 on each of which a brush (not referenced) rubs. The brushes are carried by a brush holder 16 integral with the rear bearing 14 of the machine centrally carrying a ball bearing (not referenced) rotationally supporting the rear end of the shaft 3 integrally carrying the rotor 4, here by virtue of a knurling. The brushes are linked to a voltage-regulator device here arranged outside the electrical machine.

The front end of the shaft 3 is supported in rotation by a ball bearing 11 carried by the front bearing 13 of the machine. The front end of the shaft carries, outside the machine, a motion-transmission member in the form of a pulley 1 belonging to a motion-transmission device including at least one belt in engagement with the pulley. The motion-transmission device establishes a link between the pulley and a member, such as another pulley, driven in rotation by the internal-combustion engine of the vehicle. The shaft 3 is threaded at its front end for fixing the pulley 1, internally hollow, by the use of a nut 2 as can be seen in this FIG. 1. The axis of axial symmetry X—X defines the rotational axis of the rotating electrical machine, here of the three-phase type.

When the machine—here an alternator/starter—is operating in alternator mode, that is to say as an electrical generator, the pulley is driven in rotation by the internal-combustion engine of the vehicle via at least the above-mentioned belt. When the machine is operating in starter mode, that is to say as an electric motor, the pulley is allowed to drive the engine of the vehicle in rotation via the belt.

In a variant, the motion-transmission device includes at least one chain or at least one gear or at least one pinion, such that the pulley 1 can be replaced by a toothed wheel, a gear train, a pinion or other, member constituting the motion-transmission member.

The front and rear bearings 13, 14, in a known way, are pierced for the internal ventilation of the machine, are linked together, for example by the use of tie rods as can be seen in FIG. 1, and belong to the support S of the machine which is intended to be fixed onto a fixed part of the vehicle.

In a variant, in a known way, the supports are in leaktight contact with one another and are hollowed internally at their outer periphery, of axial orientation, so as to form a circulation channel for a cooling fluid, such as the cooling fluid of the heat engine of the vehicle, such that the machine is cooled; this type of cooling being conventionally called water cooling; it is described, for example, in the document DE-A-100 19 914 mentioned above.

The support S, by virtue of the bearings 13, 14, internally carries, fixed to its outer periphery, the stator 8 of the machine including a body, usually consisting of a pack of metal plates, carrying coils or windings or, more generally, wound components the outputs of which are linked to the above-mentioned rectifier and control bridge.

The coils or windings of the stator are formed by wires or wound components made of electrically conducting bars as described, for example, in the documents WO 92/06527, FR 01 13553 filed on Oct. 19, 2001 and FR 00 16738 filed on Dec. 12, 2000; the bars may be of rectangular cross-section. The wires or the bars pass, electrically insulated, through the body of the stator 8 and are linked together to form grids extending on either side of the body of the stator 8, forming first and second buns.

More precisely, the machine includes, in a known manner, a number of phases, each including an input and an output, and the wires or bars are interlinked to form the said grids and to connect the input of the phase to the output of the phase, forming at least one winding per phase. The machine can thus be of the hexaphase type, as in FIGS. 6 to 9 of the document FR 00 16738, or of the three-phase type, as in FIGS. 2 to 6 of this document FR 00 16738. In one embodiment, the wires or bars pass axially in an electrically insulated manner through slots formed in each metal plate of the body of the stator. In a variant, the wires or bars pass centrally in an electrically insulated manner through the body of the stator, being fixed to the body of the stator by resin, as described, for example in the document U.S. Pat. Ser. No. 5,097,167.

The stator 8, which, in alternator mode, forms the armature of the machine, surrounds the rotor 4, which forms the inductor of the machine in alternator mode. The brushes are linked via the brush holder 16 to a device for regulating the voltage of the alternator in order to keep the voltage of the alternator at a desired voltage, in this case of the order of 14V, for a battery of 12V, or, in a variant, of 42V for a battery of 36V.

The rectifier bridge, the electronic unit for controlling and monitoring the arm-type rectifier bridge are here mounted in an electronics housing fitted on the outside of the machine. The same applies in one embodiment of the voltage-regulating device.

In a variant, the housing is mounted on the machine, for example on the rear or on the outer periphery of the latter.

In one variant, the voltage-regulating device is mounted on the outside of the housing while being linked electrically to the latter. Any permutation is possible.

This housing carries switching means, here including power switches, in the form of transistors of the MOSFET type, an electronic control and monitoring unit and an over-excitation circuit, for example.

The electronic unit includes a computer, such as a microcontroller, receiving information from sensors 52 described below.

The machine forming an alternator/starter here features stator windings and a rectifier bridge mounted in parallel with a battery B of a vehicle and an excitation winding carried in a fixed manner by the rotor and supplied via an over-excitation circuit.

This over-excitation circuit is active in starter mode (alternator/starter operating as an electric motor) in order to maximise the starting torque of the alternator/starter and start the internal-combustion engine, also called a heat engine, of the motor vehicle more easily, either when starting from cold or when restarting after stopping at a red light, for example; the engine having been stopped to reduce fuel consumption and thus implement a function called "stop and go".

This over-excitation circuit receives at its input the voltage of the on-board network supplied by the battery and/or the alternator and supplies the terminals of the excitation winding with a voltage higher than this voltage of the on-board network.

The assembly furthermore includes, in the manner mentioned above, switching means (power switch, for example) controlled by the electronic control unit.

This control unit is associated with the device for regulating the voltage of the alternator and controls the switching device by means of a pulse-width-modulated signal, for example.

The control and monitoring unit can likewise include means that allow it to immediately command the opening of the power switching device in order to effect rapid demagnetisation of the alternator, in particular its rotor, in the case where the alternator/starter would be discharged into the on-board network on being disconnected from the battery (an instance of "load dump" in the English terminology generally used by the person skilled in the art).

The over-excitation circuit likewise acts when the machine is operating in alternator mode.

The over-excitation circuit is controlled in such a way that the over-excitation voltage or current which it supplies is always less than a voltage or current corresponding to the maximum permissible temperature for the alternator/starter and the components associated with the latter, particularly when the machine is operating in alternator mode.

In a first mode of implementation, at least one heat sensor, which gives precise knowledge of the temperature of the hottest element, is provided on the machine.

A control loop makes it possible to keep the over-excitation voltage and/or the current supplied by over-excitation circuit to values that ensure the machine is always at a temperature lower than the permissible maximum temperature for the latter and for its components, especially in alternator mode.

According to one characteristic of this embodiment, when the machine is operating in starter mode, especially in order to start the motor vehicle, the over-excitation (voltage and/or current supplied by the over-excitation circuit) is greater than the over-excitation in alternator mode in order to maximise the starting torque (and hence starting power) of the alternator/starter.

According to one characteristic, the rotor current, i.e. the current of the excitation winding, is magnetised with a current higher than that necessary in alternator mode.

In a variant, the excitation voltage can be acted upon and increased in relation to the alternator mode.

In another mode of implementation, which is a preferred mode of implementation, the over-excitation circuit is controlled in such a way that the voltage or current which it supplies is always lower than a voltage or current which would correspond, for a given angular velocity of the rotor, especially in alternator mode, to a maximum temperature predetermined in tests or by some other means.

In one embodiment, the over-excitation circuit is controlled as a function of the angular velocity of the rotor in such a way that the over-excitation voltage or current that the over-excitation circuit supplies is always less than the maximum voltage or current corresponding to this angular velocity.

In alternator mode, the machine is thus used to its maximum potential.

In another variant, provision can be made for the duty ratio of the pulse-width-modulated signal to control the switching device, which is controlled, either as a function of the temperature or as a function of the angular velocity of the rotor, in such a way that the temperature of the hottest component of the machine is always less than the maximum permissible temperature.

In starter mode, a higher duty ratio is used here than in alternator mode. For example, the duty ratio is 100% in starter mode and 75% in alternator mode.

The implementation of this temperature-dependent control can be achieved by measuring the temperature of the hottest component and comparing it with a reference voltage.

Control can also be achieved by estimating the temperature of the hottest component from a temperature that is easy to measure (typically in the regulator) and deducing from it the said temperature of the hottest component.

This excitation circuit is, for example, a stepup voltage chopper circuit which includes an inductor mounted between a supply line at the positive voltage of the network and a switch, which is moreover connected to earth.

The excitation circuit is thus an electronic voltage booster according to one characteristic.

The overvoltage is advantageously greater in starter mode than in alternator mode.

In the case where there is an accidental break in the electrical link between the alternator and the battery ("load dump"), rapid demagnetisation is initiated, by means of switches, for example.

In one embodiment, when a circuit breaker is closed, the excitation winding of the rotor 4 is supplied with a significant voltage and/or current, e.g. with a voltage of the order of 20V and a current 10A, in the knowledge that the nominal voltage is normally 14V.

The significant voltage and/or current thus generated make it possible to apply a significant starting torque quickly.

The supply voltage of the rotor winding is then reduced in a second phase and is brought to 12V or 6A at the expiry of a given time, for example, this preventing excessive heating of the excitation winding of the alternator/starter.

The voltage then decreases and falls to zero or becomes negative when starting is detected in order to avoid overloading the heat engine in the starting phase and to avoid a situation in which it stalls upon transfer to the alternator mode.

This voltage inversion is obtained by means of a rapid demagnetisation switch, for example.

For more details, reference should be made to the document FR 00 16133, filed on Dec. 12, 2000 and, in particular, to the FIGS. 5 and 6 of this document.

The embodiments in FIGS. 7 to 11 of this document are likewise possible.

The rapid demagnetisation switch thus makes it possible to quickly deactivate the excitation winding by stopping the current in the latter.

Thanks to its [sic] arrangements, the torque—and hence the starting power—of the alternator/starter is increased to the maximum. The rotor is thus magnetised with a current flowing in the excitation winding higher than that necessary in alternator mode.

Of course, the over-excitation of the excitation winding can be achieved in some other way. For example, it is possible to act on the number of turns of the excitation coil of the rotor and on its resistance so as to obtain a higher number of ampere-turns for the same power-supply voltage. For example, considering an excitation winding of a rotor of a conventional alternator including N turns of section A corresponding to a resistance R, one embodiment of the invention consists in providing this excitation winding with N/2 turns of section 2A, corresponding to a resistance R/4

The current is thus 4 times higher than that of the conventional alternator for the same voltage. The number of ampere-turns is twice that of the conventional alternator.

In a variant, the voltage can be increased in alternator mode with the aid of a voltage booster in the manner mentioned above. For example, a voltage close to 1.5 times the nominal voltage or with [sic] a current 1.5 times the nominal current in alternator mode can be applied with the aid of an electronic voltage booster.

This overvoltage entails an increase in the electric current passing through the excitation coil.

In the operating phases in alternator mode, the excitation voltage is then brought back to a value that allows satisfactory operation for the charge balance.

For example, when the over-excitation circuit includes control in the manner mentioned above with a pulse-width-modulated signal, the excitation duty ratio can be acted upon to reduce it in alternator mode so as to have in the excitation coil an electric power to be dissipated equivalent to that of a conventional coil.

The over-excitation can be produced only in starter mode.

Over-excitation is advantageously also produced in alternator mode, giving more power for the consumer units and/or loads for a nominal voltage of 14V with a 12-V battery without the need for a more powerful battery, in the knowledge that motor vehicles are increasingly being fitted with equipment that requires more energy.

In starter mode (operation as an electric motor), the over-excited alternator/starter can drive more consumer units and/or loads, in particular when the heat engine of the vehicle is stopped at a red light, the alternator/starter then operating as an auxiliary motor.

By virtue of the over-excitation, the starting torque can be produced more rapidly and can increase and decrease more easily, owing, in particular, to the rapid demagnetisation.

The over-excitation can be achieved with an excitation winding of a lower resistance than that of conventional alternator.

In all cases, the rapid demagnetisation avoids taking torque unnecessarily from the heat engine at the start of operation in alternator mode.

The heat engine will not stall when first put into operation—in idling mode—since the excitation coil is not activated at that moment. Magnetisation [sic] of the excitation coil in alternator mode occurs once the engine has been started. This demagnetisation is employed in the case of a "load dump".

Once the starting torque is rapidly established, it is, of course, possible to achieve other shapes of curve, allowing a progressive decrease, for example.

Thanks to the rapid demagnetisation, no unnecessary torque is consumed.

After starting, the transition to alternator mode can be accomplished in a known manner with a progressive load or speed control to avoid stalling of the heat engine of the vehicle.

In a variant, control in alternator mode can, of course, be performed with an open loop.

It is thus possible not to use temperaturedependent control in alternator mode.

In one embodiment, the output curve of the alternator (current strength as a function of the number of turns per minute) is programmed with the aid of thresholds for the duty ratios of pulse-width-modulated signals fixed in advance and corresponding to the needs of the motor vehicle.

This programming reduces, for example, the current strength at high rotational speeds and at significant outputs by something of the order of 90 to 120 amperes, for example, in order, in particular, to avoid the use of excessively expensive ball bearings for supporting the rotor shaft. For economic reasons, there may thus be a self-imposed penalty in high rotational speeds. At low speeds, over-excitation is carried out.

The same applies in the medium-speed range, around 3000 rpm over-excitation being carried out, the current output then being of the order of 60 to 90 amperes.

Everything can be pre-programmed in advance, in particular in accordance with tests.

The over-excitation of the excitation winding can be achieved by varying the number of ampere-turns of the said winding.

In alternator mode, it is, of course, possible to achieve over-excitation at the high rotational speeds of the rotor thanks to the control of the abovementioned parameter.

In a variant, the excitation winding can be shaped by means of a shaping tool to give it a pointed shape or a barrel shape at its outer periphery so that the winding comes as close as possible to the axial teeth of the claw-type rotor, as described, for example, in the document FR00 06853 filed on May 29, 2000. This is advantageous for over-excitation.

The alternator/starter can, of course, be installed at the level of the clutch of the motor vehicle, as described, for example, in the document FR-A-2 782 356 filed on Jul. 28, 1999.

The rotor of the alternator/starter can thus be installed between the internal-combustion engine of the motor vehicle and the reaction plate of the friction clutch.

In a variant, the rotor can be installed downstream of the friction clutch.

In these two cases, the rotor is driven in rotation by the engine flywheel of the motor vehicle, which is linked in rotation to the crankshaft of the heat engine of the motor vehicle.

The rotor can be carried by the engine flywheel, which drives in rotation of [sic] the friction clutch, the reaction plate then forming the rear extremity of the engine flywheel.

In the manner mentioned above, this flywheel can be in two parts such that, in this case, the rotor is carried by the primary part, fixed in rotation to the crankshaft, or the secondary part, fixed to the reaction plate of the clutch, intended to co-operate with a friction face of the friction disk of the clutch. Elastic members as well as possibly a torque limiter are interposed between these two parts for good filtration of vibrations and formation of a dual damping flywheel. In a variant, these two parts are integral, it being possible for one of them to be axially flexible to form a flexible flywheel.

The alternator/starter can be brushless. In a variant, the alternator/starter includes a salient-pole rotor with excitation windings associated with each pole. A salient-pole rotor of this kind is described in the document PCT/FR 02/00037, for example, to which reference should be made for more details. In all cases, the rotor of the machine includes at least one excitation winding.

Also provided are means for tracking the angular position of the rotor so that, in electric-motor mode, electric current can be injected into the appropriate phase and hence into the relevant winding of the stator at the right moment.

These means, which are advantageously of the magnetic type or, in a variant, of the optical type, send information to the electronic control unit and are described, for example, in the documents FR-A-2 807 231 filed on Nov. 20, 2000, FR-A-2 806 223 filed on Mar. 10, 2000, and FR-A-2 806 224.

Thus, in FIG. 1, a target 50 is fixed on a target holder locked in rotation onto the rotor 4. The target holder is installed axially between the rotor 4 and the rear bearing 14, radially below the blades 45 of the fan 44. This target holder forms a spacer between the rotor 4 and the inner race of the ball bearing of the rear bearing 14 and partially surrounds the outer race of this ball bearing, as can be seen in the figures of the documents FR-A-2 806 223 and FR-A-2 806 224 mentioned above. Fixed on the transverse wall of the rear bearing is a sensor holder 53, which here carries three sensors 52 of the Hall-effect type or, in a variant, of the magneto-resistive type, the resistance of which varies as a function of the magnetic flux.

Here, the target 50 is magnetic and carries alternate North and South poles. Sensing by the threshold sensors 52 is of the radial type. To do this, the target holder 53, made of plastic material for example, has portions 55 of axial orientation 55, here passing through a large hole 54 in the bearing 14. Each portion 55 carries a sensor 52 installed radially above the axially oriented target 50 carried by the outer periphery of the target holder. In a variant, the target is notched and the sensors are of the magneto-resistive type.

The sensor holder 53 has lugs 56 with oblong holes, through each of which there passes a fixing bolt 57 at the bottom of the bearing 14. The portions 55 are installed radially below the blades 45. The position of the sensor holder 53 can thus be adjusted circumferentially relative to the bearing 14. A protection cap 17, conventionally made of plastic material, with openings crowns the rear part of the machine and, in particular, the brush holder 16 and the sensor holder 53. This cap 17 is fixed on the rear flange 14 forming, with the front bearing 13, the fixed support S of the stator 8 of the machine, which is of the synchronous type. Here, the bearings are metallic, being based on aluminium, for example, and are connected electrically to the vehicle earth.

In a variant, sensing is performed axially, the sensors being installed axially opposite the target. In a variant, the target holder is installed between the bottom of the front bearing 13 and the rotor in place of the spacer 70, supported on the inner race of the ball bearing 11. The sensor holder 53 is then fixed in an angularly adjustable manner on the front bearing 13.

In a variant, the target is fixed on the pulley 1, facing the sensor holder carried by the front bearing 13 in such a way that its angle can be adjusted, as described in the document FR-A-2 807 231 mentioned above; it being possible for sensing to be of the axial or radial type.

In a variant, the sensors are mounted on a holding piece that carries, on its outer periphery, the stator of the machine and allows definition of a precise gap with the rotor. The engine flywheel carries the rotor of the machine and the reaction plate of the clutch. Bearing means, such as at least one ball bearing, are interposed between the engine flywheel and the inner periphery of the holding piece, including a part in the form of a U partially surrounding the rotor, carrying a code wheel. The sensors are installed facing this code wheel, as described in FIGS. 23 to 25 of the document FR 0016710 filed on Dec. 20, 2000. The machine is then of the synchronous type.

The target advantageously includes a number of pairs of North-South magnetic poles identical to those of the rotor. The target holder is of non-magnetic nature or, in a variant, of magnetic nature. The target can include ferrites and/or rare earths or include only inert sectors subjected to flux by the rotor's magnetic field.

The means for tracking the angular position of the rotor are thus of the magnetic type with Hall-effect or magneto-resistive sensors.

In a variant, these tracking means are of the optical type and thus employ optical sensors, such as optoelectronic sensors.

In all cases, the sensors send information to the electronic control and monitoring unit. Here, three sensors, one sensor per phase, are provided, the signals from the sensors being shifted in a known manner by an angle of 120 electrical degrees for sequential supply of the phases of the stator 8, allowing the creation of a rotating electromagnetic field.

It is the object of the present invention, in particular, to improve the operation of this machine, here of the synchronous type, in auxiliary-motor mode.

According to the invention, a method for control of a multi-phase, reversible, rotating electrical machine, called alternator/starter, for a motor vehicle with a heat engine capable of operating either as an electrical generator—alternator mode—or as an electric motor, especially in order to start the heat engine, is characterised in that, during operation in electric-motor mode, the said machine is driven according to two modes corresponding to different speed/torque characteristic curves, namely a first mode, called starter mode of the heat engine, making it possible to drive the heat engine of the vehicle in order to start it with high torques for low speeds, while the second mode, called auxiliary-motor mode, makes it possible to drive the machine alone, or at least one power-consumer unit, such as an accessory, and/or the heat engine, at higher speeds and lower torques than those of the first mode.

In one embodiment, the sensors are made to operate according to two modes.

More precisely, thanks to the invention, as can be seen in FIG. 2, the characteristic curves A, B-C, D respectively for the power and the torque are obtained while operating in electric-motor mode as a function of the number of revolutions per minute of the rotor 4 of the machine, the rotational speed of which is proportional to that of the crankshaft of the heat engine of the vehicle. In this FIG. 2, the number of revolutions per minute of the heat engine has been shown on the abscissa.

The power curve A,B passes quickly through a maximum, and then decreases (portion A: power with device W). From a threshold n, there is a change of mode so as to transfer to the second mode—operation as an auxiliary motor—and describe the portion B (power without device W) of the curve A, B.

This is achieved before the power falls to zero, in this case at 1500 rpm. This fall to zero depends, of course, on the application. The curve A' in broken lines corresponds to the continuation of the characteristic curve A without the arrangements according to the invention and hence the power falling to zero at 1500 rpm.

When considering the torque curve C, D, it will likewise be seen that this curve comprises two sections, namely sections C (torque with device N.m) and D (torque without device N.m), corresponding respectively to the first and the second mode according to the invention, with a change of curve at point n, the curve C' extending the curve C and falling to zero at 1500 rpm in this case. The point n here corresponds to a high torque close to the maximum of the curve A.

By virtue of the invention, a torque is produced after a speed threshold of 1500 rpm in this case.

In the second case—operation as an auxiliary motor—the excitation current of the excitation winding of the rotor is, of course, regulated in a different way from that in starter mode and in alternator mode.

It will be seen that the maximum torque is close to a speed of zero since, as mentioned above, the torque rises rapidly at the outset.

According to one characteristic, the setting of the sensors 52 of the means for tracking the angular position of the rotor 4 is optimised.

The signals sent by the sensors 52 to the electronic monitoring and control unit are used in straightforward order until the auxiliary-motor function is activated or until the activation speed corresponding to point n of FIG. 2 is reached. This corresponds to the curves A and C.

The electronic and monitoring [sic] unit driving the rectifier bridge and control [sic], likewise called inverter, including arms with diodes, as can be seen in the documents EP-A-0 260 1786, FR-A-2 745 444 and FR-A-2 745 445, for example, to which reference can be made for more details, the arms of the inverter (of the bridge) are driven directly so as to supply sequentially the windings of the phases of the stator 8, each including at least one layer of electrically conducting elements.

Once the activation speed has been reached point n in FIG. 2), permutation and inversion of the signals from the sensors is performed in a simple and economical manner.

Here, this make it possible to phase-shift the signal for control of the arms of the inverter (each arm being associated with one phase) by −60 electrical degrees in relation to direct driving of the phases of the stator. Other permutations in steps of −60 electrical degrees are possible in order to achieve a higher speed. An offset around the desired speed (point n) activates or deactivates this function. Everything takes place as if there were a new phase sensor in the second mode.

In relation to position 0 corresponding to direct sensing of the signals from the sensors by the control and monitoring unit so as to control the arms of the rectifier bridge in a sequential manner, for example, permutation of the signals from the sensors—say a phase shift of −120°—is effected at the threshold speed n, followed by inversion so as to arrive at position 1, consisting in a phase shift of −60° in relation to position 0. This is generally applicable.

Thus it is possible, in the second mode, to obtain a different change for a speed n2 higher than n by effecting another phase shift of the signals from the sensors of −60 electrical degrees. This is achieved by permutation of the signals from the sensors in relation to position 0 so as to arrive at the shifted position 2 of −120° in relation to position 0 and of −60° in relation to position 1.

As is evident from the description, another change—position 3—for a speed n3 higher than n2 can be obtained by effecting permutation and inversion of the signals from the sensors in relation to position 2. The phase shift is then −180° in relation to position 0.

Another position 4 is obtained for a higher speed n4 by effecting permutation (−120°) of the signals from the sensors in relation to position 2 and the same follows for position 5 (n5 higher than n4 and permutation and inversion in relation to position 4) so as to arrive at a position 6 corresponding to a phase shift of −360° in relation to position 0, that is to say to a return to position 0.

All these variations lead to the formation of new sensors at each position, this being achieved with the same sensors, either by permutation and inversion or by inversion of the signals from the sensors.

Figure 3:
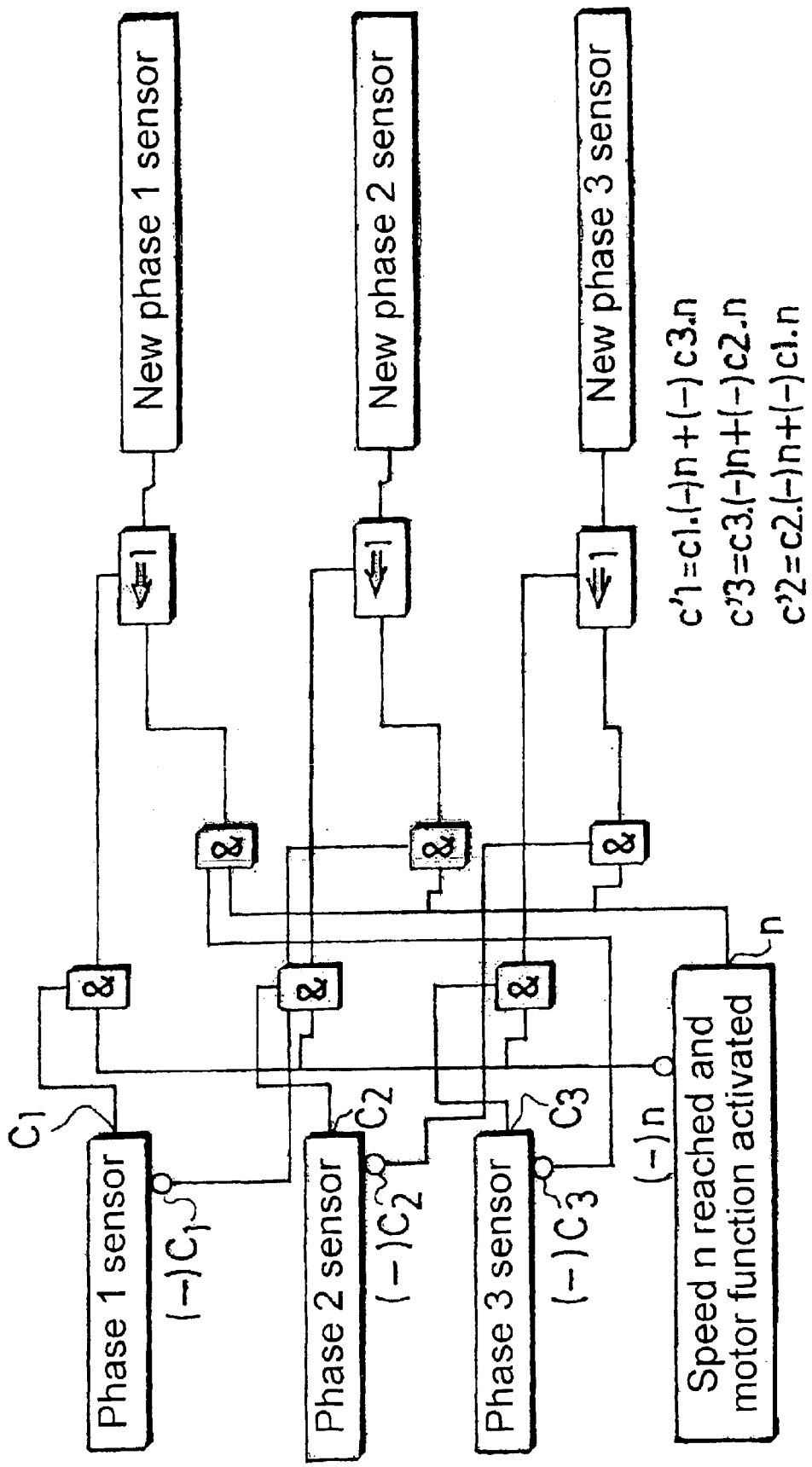
FIG. 3 illustrates a power-supply circuit in accordance with one possible implementation of the invention.

The function can be obtained either by data processing with the aid of the computer of the electronic control and monitoring unit and of pre-recorded tables or with the aid of discrete components as described in FIG. 3.

The rotational speed of the crankshaft of the heat engine is, of course, measured either directly or via a multiplication ratio, by measuring the rotational speed of the rotor 4, for example.

Here, each sensor is dedicated to one of the phases of the stator of the machine, which is of the three-phase type here. In association with the target, these sensors detect the angular position of the rotor 4 and send information to the electronic control and monitoring unit to enable the latter to control, via the arms of the rectifier bridge, the injection of current into the winding of the phase concerned. This occurs when the sensor concerned sends a respective activation signal C1, C2, C3 to the said unit from a threshold.

Apart from this activation, the sensors send a non-activation signal (−) C1, (−) C2, (−) C3 to the said unit.

In FIG. 3, each phase sensor 1, 2, 3, when activated, sends its signal C1, C2, C3 to a first logic gate receiving information from a block designed to indicate that the speed n has been reached and that auxiliary-motor operation has been activated.

More precisely, when the rotational speed of the crankshaft corresponding to the threshold speed n has not been obtained, this block sends information, in this case (−)n to the first logic gate associated with each phase sensor 1, 2, 3.

These first logic gates are of the AND type, such that, when one of the phase sensors is activated and the speed n has not been reached (information (−)n)), the first logic gate delivers a signal (reference<=1 in FIG. 3). Thus, until the speed n has been reached, the phase sensors normally operate in accordance with the first mode.

As soon as the speed n has been reached and the motor function has been activated, the above-mentioned block sends information n to second logic gates, each second gate being associated with one of the phase sensors.

The second logic gate of phase sensor 1 is thus linked to phase sensor 3 and to the block, the second logic gate of phase sensor 2 is linked to phase sensor 1 and to the block and, finally, the second logic gate of phase sensor 3 is linked to phase sensor 2 and to the block.

More precisely, these second logic gates are linked to the outputs of these sensors indicating that the sensor is inactive.

When the speed n is reached and the auxiliary-motor function is activated, the second logic gate of the AND type delivers a permuted and inverted signal.

More precisely, the second logic gate of phase sensor 1 delivers this signal when phase sensor 3 is inactive; the first logic gate no longer delivering a signal because the condition of the speed being less than n is no longer satisfied. All this takes place as if there were a new phase sensor C'1 sending information to the electronic control and monitoring unit.

The equation of this new sensor is C'=C1. (−)n+n. (−)C3, in which C'1 is the active signal delivered by this new sensor, corresponds [sic] to the AND condition, (−)C3 or (−)(n) to the inactive condition of the sensor C3 and of the block and + to the OR condition.

Below the speed n, the new phase sensor 1 corresponds to phase sensor 1 and is thus active (delivers a signal) only when phase sensor 1 is active. Once the speed n has been reached and the auxiliary-motor function has been activated, the new phase sensor 1 is active only when phase sensor 3 is inactive.

The same applies to phases 2 and 3, the equations for the new phase sensors 2 and 3 being C'3=C3. (−) n+n. (−) C2 and C'2=C2. (−) n+n. (−) C1.

Thus, in the second mode, the signals for control of the phases are phase-shifted by −60 electrical degrees in relation to direct driving (relation C. (−) n) satisfied.

As explained above, there is, of course, a need, in the auxiliary-motor function, for a device to disengage the machine and the accessory to be driven from the crankshaft. This device can comprise an electromagnetic clutch, as described in the document FR-A-2 648 886, for example.

In this case, the motor includes a fixed projection, on which is rotatably mounted the pulley of the crankshaft, the end of which is connected in terms of rotation to a connecting piece firmly attached to the plate of the electromagnetic clutch, the coil of which is suitable for firm attachment to the projection.

The fixed plate of the clutch is firmly attached to one of the flanges of the pulley.

Controlled freewheel devices can be used, as described in the document EP-A-0 715 979, for example.

In a variant, different transmission ratios are used as a function of the operating mode chosen, as described above. For example, it is possible to use a transmission in the form of a variable-speed drive unit with a driving pulley, a driven pulley and a belt passed around both these pulleys in an endless loop. Each pulley has two frustoconical flanges, at least one of which is mounted so as to be capable of axial motion under the control of elastic return means.

Thus, when the mobile flange of the driven pulley is in a fully advanced position, the mobile flange of the driving pulley is in a fully retracted position and vice versa, as described in the above-mentioned document FR-A-2 648 886, to which reference may be made.

The present invention is, of course, not limited to the exemplary embodiments described.

Thus the stopping and restarting phases can be managed either by the ECU (electronic control unit of the heat engine) of the vehicle or by the microcontroller of the heat engine of the driving electronics [sic], each of the solutions using the information coming from the vehicle and transmitted either in analog form or in digital form via a link, of the CAN type, the VAN type etc, for example, to use the English terminology, or by a mixture of the two.

The function of regulating the on-board voltage generated during the alternator modes is monitored by means of the microcontroller. During braking operations of the vehicle, the regenerative braking mode is activated, the effective field ratio is increased in order to take a higher torque from the motor and the energy thus recovered is stored in a device designed for this purpose (ultracapacitor for example), which will return the electrical energy to the on-board network, either for a restart if the braking action was intended to bring the vehicle to a halt or for the consumer units connected, hence reducing the torque taken by the generator, thus making it possible to increase the yield of the system.

This energy can also be used during stop phases and auxiliary-motor mode use. This motor is used to drive either an air conditioner or any other mechanical device.

In order to ensure cold starting of vehicles with a large engine capacity, it is possible to use an associated auxiliary starter in very cold weather, as described in the document FR-99 10316 filed on Aug. 9, 1999. Control of this starter is not activated until the temperature sensor of the system's electronics detects a temperature lower than a minimum value. The driving strategy is then: t0 activation of the solenoid of the auxiliary starter and pre-excitation of the excitation winding of the rotor with the aid of the control and monitoring unit. This order can be modified and adjusted taking account of the time constants of the two machines. The starter mode is then activated.

The power supplied by each machine is then additional and thus allows starting. As soon as the sensor of the system's electronics detects a temperature above t0 upon application of a voltage, the starter is no longer used.

This strategy makes it possible to drive the heat engine at higher speeds than that of a starter in normal operation and hence to make starting cleaner in terms of emissions from the heat engine.

In order to facilitate the cabling of the system on the vehicle, a connection device with at least one connector with two subassemblies provided with a single fixing means, such as a means involving a screw and a nut, between which it is possible to clamp corresponding electrically conducting elements of the two subassemblies, will advantageously be used, as described in the documents FR-01 00931 of Jan. 24, 2001 and FR-00 10737 of Aug. 18, 2000.

In the second mode, the electric-motor operation mode, the machine can, of course, be used to drive the heat engine above the rotational speed—in this case 1500 rpm—at which the power falls to zero. The heat engine thus starts properly.

It is likewise possible, especially after starting the heat engine, to drive the electrical machine alone in the second mode before making the transition to alternator mode. For example, the load (the mechanical power-consumer unit) can be disengaged with the aid, for example, of an electromagnetic clutch mounted within a pulley, one of the flanges of which forms a secondary pulley, as described in the document FR-A-2 648 886. After stopping at a red light, the load is shed—disengaged—that is to say that the power-consumer unit is disconnected during the restarting operation.

What is claimed is:

1. Method for control of a multi-phase, reversible, rotating electrical machine, called alternator/starter, for a motor vehicle with a heat engine capable of operating either as an electrical generator—alternator mode—or as an electric motor, especially in order to start the heat engine, is [sic] characterised in that, during operation in electric-motor mode, the said machine is driven according to two modes corresponding to different speed/torque characteristic curves, namely a first mode, called starter mode, making it possible to drive the heat engine of the vehicle in order to start it with high torques for low speeds, while the second mode, called auxiliary-motor mode, makes it possible to drive the machine alone, or at least one power-consumer unit and/or the heat engine, at higher speeds and lower torques than those of the first mode.

2. Method according to claim 1, characterised in that, when the power-consumer unit is used before the vehicle has been started, the said consumer is brought to its rotational speed via the said machine, passing through the first mode without driving the heat engine.

3. Method according to claim 2, characterised in that, to restart the vehicle—with the electrical machine in the second mode of operation as an electric motor and with the crankshaft of the heat engine disengaged—the machine is brought to its maximum attainable speed, and the crankshaft is then engaged.

4. Method according to claim 3, characterised in that the consumer unit is disconnected during the operation of restarting the heat engine.

5. Method according to claim 1, characterised in that, starting from a machine including a rotor (4) carrying at least one excitation winding, the excitation winding of the rotor is over-excited during the operation of the machine in starter mode in order to maximise the starting torque of the said machine.

6. Method according to claim 5, characterised in that, when the machine is operating as an electric motor, the excitation winding is over-excited in different ways in starter mode and in auxiliary-motor mode, and in that the excitation winding is over-excited in a different way when the machine is operating as an electric motor and when the machine is operating in alternator mode.

7. Method according to claim 1, characterised in that a parameter that is a function of the voltage at the terminals of the excitation winding and/or of the current in this excitation winding is monitored so as to keep this parameter continuously on the same side of a threshold value which corresponds to a maximum permissible temperature for the electrical machine and its components.

8. Method according to claim 5, characterised in that rapid demagnetisation of the over-excitation winding is performed before transferring to alternator mode.

9. Method according to claim 1, characterised in that, starting with an electrical machine equipped with a stator (8) having phases, with a rotor (4) and with means including sensors (52) for tracking the rotation of the rotor (4), the said sensors being suitable for sending signals to an electronic unit for controlling and monitoring the phases of the stator (8), the signals from the sensors (52) are used in straightforward order until the auxiliary-motor mode function is activated or the speed of activation of this function is reached.

10. Method according to claim 9, characterised in that, when the auxiliary-motor mode function is activated and the activation speed of this function is reached, permutation and inversion of the signals from the sensors are performed.

11. Method according to claim 10, characterised in that the permutation and inversion are carried out in such a way as to create a phase shift with a pitch of −60 electrical degrees.

12. Method according to claim 10, characterised in that the inversion and permutation are carried out by means of two logic gates associated with each sensor and of a block that indicates the status of the auxiliary-motor mode function—activated or not activated—and the speed of activation of this function—reached or not.

13. Method according to claim 12, characterised in that each first logic gates is a gate and open when the sensor concerned is activated in order to supply a signal and when the said function is not activated or its speed of activation is not reached.

14. Method according to claim 13, characterised in that each second logic gates is a gate and open when one of the other sensors is not activated in order to supply a signal and when the said function is activated—speed of activation reached.

15. Method according to claim 10, characterised in that the inversion and permutation are carried out by data processing operations.

16. Method according to claim 10, characterised in that, beyond the speed of activation, inversion of the signals from the sensors is carried out for a speed above the speed of activation.

* * * * *